(12) United States Patent
Kennedy

(10) Patent No.: US 6,696,677 B2
(45) Date of Patent: Feb. 24, 2004

(54) METHOD FOR APPLYING MICROWAVE SHIELD TO COVER OF MICROWAVABLE FOOD CONTAINER

(75) Inventor: Michael Kennedy, Gates Mills, OH (US)

(73) Assignee: Rock Ridge Technologies, Co., Willoughby, OH (US)

( * ) Notice: Subject to any disclaimer, the term of this patent is extended or adjusted under 35 U.S.C. 154(b) by 292 days.

(21) Appl. No.: 09/972,451

(22) Filed: Oct. 5, 2001

(65) Prior Publication Data

US 2003/0068413 A1 Apr. 10, 2003

(51) Int. Cl.[7] .............................. H05B 6/80; B44C 1/17
(52) U.S. Cl. ...................... 219/729; 219/734; 219/725; 426/234; 99/DIG. 14; 156/69; 156/166; 156/233
(58) Field of Search .................. 219/725, 729, 219/728, 734, 735; 426/107, 109, 234, 241, 243; 99/DIG. 14; 156/166, 180, 66, 69, 233

(56) References Cited

U.S. PATENT DOCUMENTS

| 3,219,460 A | 11/1965 | Brown |
| 3,302,632 A | 2/1967 | Fichtner |
| 4,676,857 A | * 6/1987 | Scharr et al. ................ 156/233 |
| 4,735,513 A | * 4/1988 | Watkins et al. ............. 383/116 |
| 5,126,518 A | 6/1992 | Beckett |
| 5,298,708 A | 3/1994 | Babu et al. |
| 5,428,209 A | 6/1995 | Babu et al. |

FOREIGN PATENT DOCUMENTS

| JP | 62-252831 | * 11/1987 | ................. 219/729 |
| JP | 63-137827 | * 6/1988 | ................. 219/729 |

* cited by examiner

Primary Examiner—Philip H. Leung
(74) Attorney, Agent, or Firm—Pearne & Gordon LLP

(57) ABSTRACT

A method for providing a microwave-shield on the cover member of a microwavable food tray having different foods therein requiring different degrees of microwave irradiation is provided. The method includes providing an adhesive label directly to a cover member of the food tray in register with one of the food products in the tray. The cover member is provided on the food tray from a sheet of cover material having a plurality of microwave shields pre-applied thereto at discrete intervals.

27 Claims, 2 Drawing Sheets

METHOD FOR APPLYING MICROWAVE SHIELD TO COVER OF MICROWAVABLE FOOD CONTAINER

BACKGROUND OF THE INVENTION

1. Field of the Invention

The invention relates generally to a microwave shield for a food container. More particularly, the invention relates to a microwave shield that is pre-applied to a sheet of cover material, and a method of application to a food container.

2. Description of Related Art

Pre-packaged microwavable meals, also called "TV-dinners" usually contain a variety of different foods; e.g. meat, potato, mixed vegetable, and dessert. These foods cook at different rates in a microwave oven due to the rate at which they absorb microwave energy as well as their individual heat capacities.

Microwave shields are often provided to prevent over cooking of high-absorbing food products. These shields are provided in a variety of forms; sometimes they are provided separately in the box with a TV-dinner for placement by the consumer prior to cooking. Otherwise the shield may be in the form of an enclosure within which the TV-dinner is wrapped or inserted by the consumer prior to cooking. These types of microwave heat shields are cumbersome to use and expensive to manufacture.

It would be preferred to provide a microwave shield directly to a microwavable food container during a manufacturing process thereof. Preferably, such a microwave shield would be applied such that it selectively shields certain high-absorbing foods while leaving other low-absorbing foods more substantially exposed to microwave irradiation. Most preferably, such a microwave shield is pre-applied to the cover member of a microwavable food container or tray.

SUMMARY OF THE INVENTION

A method is provided for providing a microwave-shield to a microwavable food tray having different foods therein requiring different degrees of microwave irradiation. The method has the steps of: (a) providing a microwavable food tray containing at least one low-absorbing and at least one high-absorbing food component, the low-absorbing food component requiring a greater degree of microwave irradiation to be heated to a desired temperature at the end of a microwave cooking cycle than the high-absorbing food component, wherein the food tray has a cover member thereover to cover the foods in the food tray; and (b) adhering a microwave shield to the cover member of the food tray, the microwave shield being applied to the cover member substantially in register with the high-absorbing food component, wherein the microwave shield has a shape substantially corresponding to the shape of the high-absorbing food component, and is effective to divert a portion of incident microwave radiation away the high-absorbing food component during a microwave cooking cycle.

A method for providing a cover member having a microwave-shield already attached thereon to microwavable food trays having different foods requiring different degrees of microwave irradiation is also provided. The method has the steps of: (a) providing microwavable food trays having at least one low-absorbing and at least one high-absorbing food component, the low absorbing food component requiring a greater degree of microwave irradiation to be heated to a desired temperature at the end of a microwave cooking cycle than the high-absorbing food component; (b) providing a sheet of food tray cover material having a plurality of microwave shields applied thereto and indexed at discrete intervals along the length thereof; and (c) delivering the food trays successively to a cover applicator machine in a microwavable food packaging process, wherein the cover applicator machine draws cover material from the sheet and applies therefrom a cover member having a microwave shield to each food tray, wherein the indexing interval facilitates application of a cover member to each food tray in the packaging process. Each microwave shield is applied substantially in register with a food component in each tray.

A sheet of microwavable food tray cover material is also provided having a plurality of microwave shields applied to and indexed at discrete intervals along the length thereof.

DETAILED DESCRIPTION OF THE PREFERRED EMBODIMENTS OF THE INVENTION

In the description that follows, when a range is given such as 5 to 25 (or 5–25), this means preferably at least 5, and separately and independently, preferably not more than 25. As used herein, a high-absorbing food component is a food component that absorbs microwaves in a microwave oven at a high rate, thereby heating to a desired serving temperature with a lesser degree of microwave irradiation compared to a low-absorbing food component. A low-absorbing food component is a food component that absorbs microwaves in a microwave oven at a slow rate, thereby requiring a greater degree of microwave irradiation to achieve a desired serving temperature compared to a low-absorbing food component.

Also as used herein, a first element or component is in register with a second element or component if the first element substantially corresponds and is aligned with or over the second element. Most preferably, the first and second components also have substantially the same shape and dimensions, however this is not required.

Figure 1:
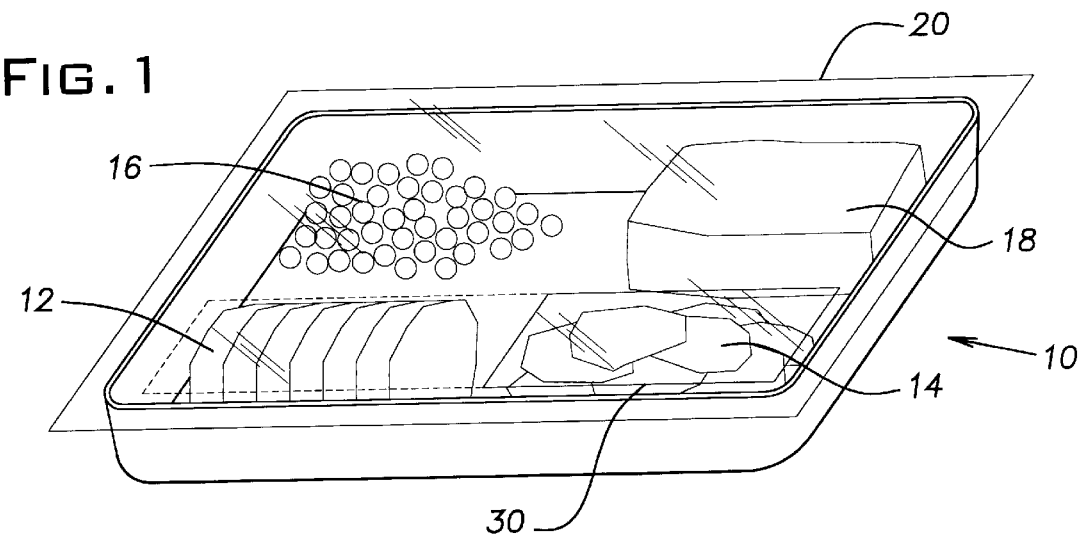
FIG. 1 is a perspective view of a microwavable food tray having a cover member with an adhesive microwave shield according to a first preferred embodiment of the invention.

Referring to FIG. 1, a microwavable food tray 10 is shown having a cover member 20, and four separate food components; high-absorbing food components 16 and 18, and low-absorbing food components 12 and 14. A microwave shield 30 is provided on the cover member substantially in register with low-absorbing food component 14, in this case a potato. Optionally, microwave shield 30 can be extended to also cover low-absorbing food component 12 as shown with a broken line in FIG. 1. Alternatively, separate microwave shields can be provided on the same cover member 20 to shield separate food components.

Figure 2:
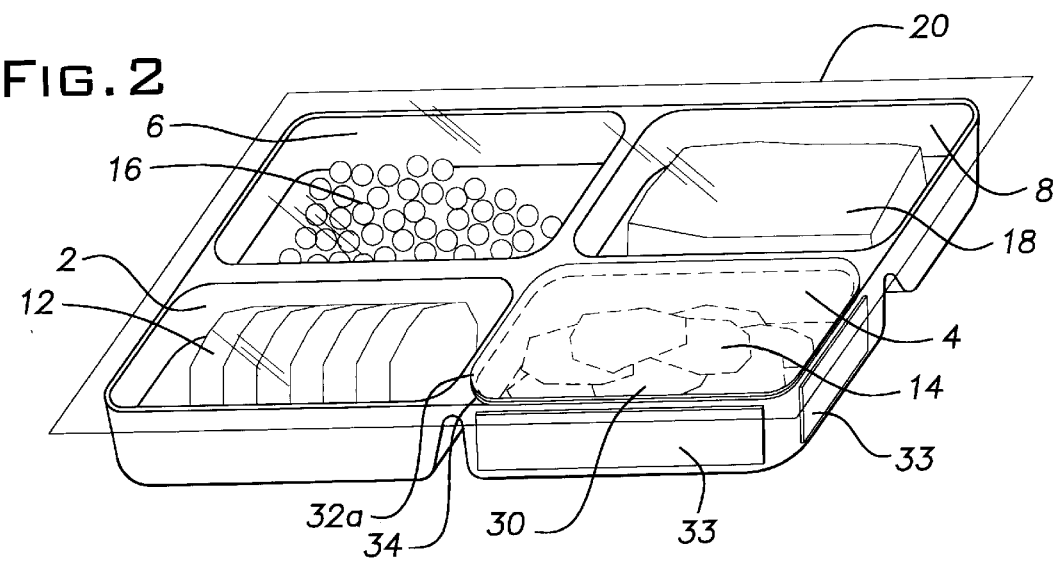
FIG. 2 is a perspective view similar to FIG. 1, except that the food tray has separate compartments which isolate and contain the individual food components.

Preferably, the microwave shield 30 is provided having a shape that substantially corresponds to the shape of the food component to be shielded. As shown in FIG. 2, microwave tray 10 can be provided with separate compartments, e.g. compartments 2, 4, 6, and 8 respectively for food components 12, 14, 16, and 18. In this embodiment, a microwave shield 30 is preferably provided on cover member 20 having substantially the same shape and substantially in register with the compartment containing the food component to be shielded. Also, as shown in FIG. 2, side microwave shields 33 can be provided on the side walls of an individual compartment (e.g. compartment 4 in FIG. 2) to provide more effective microwave shielding.

A microwave shield applied in this manner is effective to divert at least a portion of incident microwave radiation from the shielded high-absorbing food component during the microwave cooking cycle, toward other, low-absorbing food components.

Most preferably, the microwave shield 30 is an adhesive label that is applied to the cover member 20 according to a first preferred embodiment of the invention. Preferably, shield 30 has a microwave reflective layer 32a and a pressure sensitive adhesive (PSA) layer 34. The adhesive microwave shield is applied to cover member 20 by a labeling machine that applies sufficient pressure to activate the PSA layer when adhering to the cover member 20. The labeling machine applies at least one microwave shield to each food tray cover member 20 such that the microwave shield 30 is substantially in register with one food component in the tray. Optionally, the labeling machine can apply multiple (at least two) microwave shields to each cover member 20 such that each shield 30 is substantially in register with a separate food component in the same food tray 30.

The microwave reflective layer 32a is a metal layer, preferably a metal foil layer having a thickness of 0.001–0.020, preferably 0.004–0.018, preferably 0.006–0.015, preferably 0.008–0.012, preferably about 0.010, inches. The PSA layer can be any PSA layer known in the art that is nontoxic and effective to adhere to the reflective layer 32a and the cover member 20. Preferably, the PSA layer causes no offensive odor and results in no, or substantially no flavor transfer to any of the food components in a microwavable food tray from microwave irradiation in a microwave oven. The metal foil layer can be made of aluminum, copper or tin, less preferably brass or steel, less preferably any other metal or metal alloy effective to reflect microwaves. Less preferably, reflective layer 32a can be a nonmetallic layer so long as it is effective to reflect microwaves. Metal foil layers are continuous layers having no or virtually no gaps on their surface where microwaves could penetrate. This is why metal foil reflective layers are preferred.

However, for extremely low-absorbing food components (i.e. those that cook very slowly in a microwave oven such as a potato), a porous metal or non-metallic reflective layer 32a can be used to accelerate heating. It has been found that a porous microwave shield actually has the effect of enhancing, not shielding, microwave irradiation of a covered food product. Without wishing to be bound by any particular theory, this is believed due to the fact that such a porous reflective layer 32a will transmit a portion of the incident microwaves, e.g. 5, 10, 20, 30, or 40, percent, to the underlying food component. The transmitted microwaves irradiate the food component. A portion of the microwaves to reach the food component will not be absorbed, however, and will exit the food component. Ordinarily, this unabsorbed radiation is lost, or is only randomly reflected back to the food component. The porous microwave shield reflects a portion of the unabsorbed radiation back at the food component while simultaneously transmitting incident microwaves from the microwave emitter in the oven. In this manner, microwaves are concentrated in the underlying food component and a more rapid, more efficient cooking cycle is established. The material and porosity of reflective layer 32a can be selected to control the rate of heating for a particular food component during a microwave cooking cycle.

Figure 3:
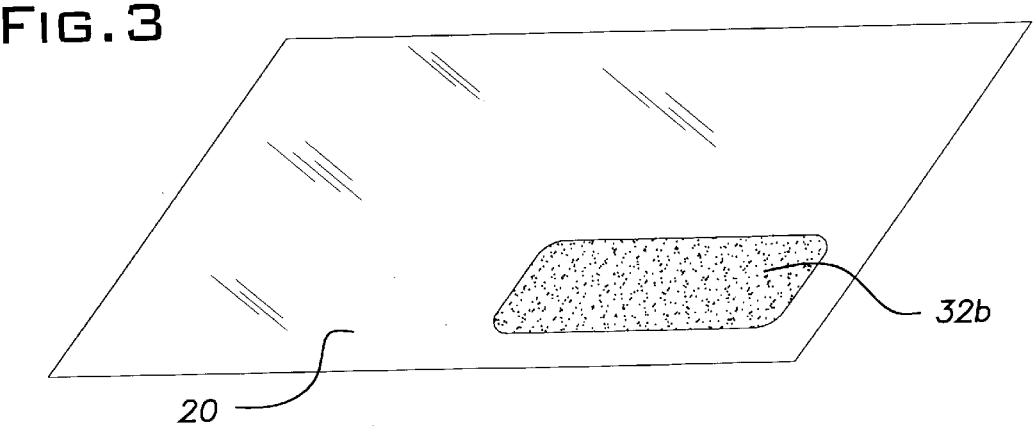
FIG. 3 is a perspective view of a cover member as shown in FIGS. 1 and 2 but having a printed or inked microwave shield according to a second preferred embodiment of the invention.

Alternatively, a reflective layer 32b can be directly applied to cover member 20 without an intervening PSA layer 34 according to a second preferred embodiment of the invention. (See FIG. 3). In this embodiment, the reflective layer 32b is most preferably applied to a cover member 20 via a printing process, such as an inkjet printing process, less preferably via a metal deposition process such as metal vapor or powder deposition, whereby the reflective layer 32b comprises a conductive or metallic ink. Preferably, the printing process includes applying the conductive ink to the cover member with a printing machine that is controlled by a microprocessor. Preferably, an operator can input into the microprocessor the shape and position of a desired conductive ink layer to be printed upon the cover member, such that the resulting ink layer is substantially in register with a high-absorbing food component in the food tray, or a compartment of the food tray having a high-absorbing food component.

When such a conductive ink is used, the ink preferably has particles or flakes of conductive material (such as aluminum flakes) dispersed in a water based or UV-cured carrier fluid. Such a conductive ink layer preferably has a thickness of 0.0007–0.020, preferably 0.001–0.018, preferably 0.0015–0.015, preferably 0.0018–0.01, preferably about 0.002, inches. Ink layers as above described are difficult to apply in a continuous, nonporous layer. Hence, where total shielding of high-absorbing food components is desired, a microwave shield having a continuous metal foil layer as in the first preferred embodiment should be employed. However, when a heat-enhancing shield is desired to enhance cooking of a low-absorbing food component, a printed ink reflective layer may be preferred. The inking density of the printed reflective layer 32b is controlled via a known technique to provide a reflective layer 32b having the desired porosity to suit the particular food component to be heated. By controlling the porosity of the reflective layer 32b, one can control the rate of heating of an underlying food component.

Figure 4:
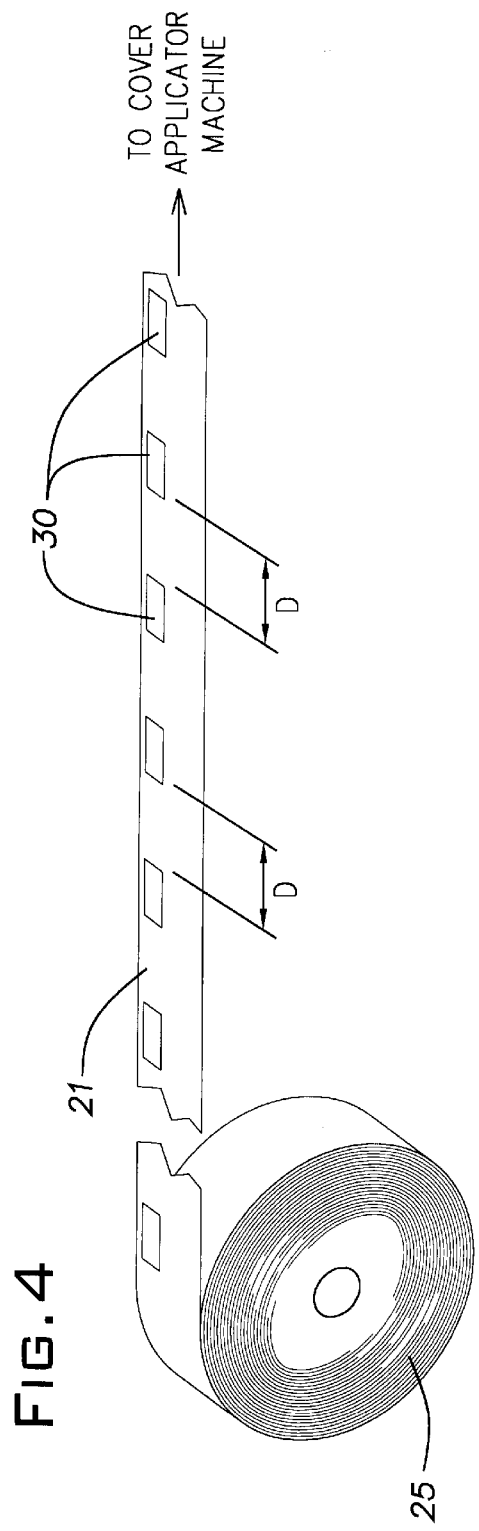
FIG. 4 is a perspective view of a sheet of microwavable food tray cover material being fed from a roll, and having a plurality of microwave shields according to the invention.

As shown in FIG. 4, microwave shields 30 according to the invention are most preferably pre-applied to a sheet of cover material 21 from which individual cover members 20 will be cut out for application to individual food trays 10. The microwave shields 30 can be adhesive labels having both metal reflective and PSA adhesive layers 32a and 34, or they can be inked or printed reflective layers 32b. A plurality of microwave shields are pre-applied to the sheet of cover material 21 via conventional techniques or as above described, and are indexed at a discrete interval D along the length of the sheet 21. Individual cover members 20 are cut out of the sheet 21 and applied to the food trays 10 by a cover applicator machine. (See FIG. 5). The indexing interval D is selected to facilitate application of a cover member having at least one properly aligned and oriented microwave shield 30 to individual food trays in a TV-dinner packaging process. Optionally, microwave shields 30 can be provided on sheet 21 such that each cover member 20 cut out of the sheet 21 has multiple (i.e. at least two) microwave shields 30 thereon. These microwave shields are preferably aligned such that they will be substantially in register with separate food components in the food tray 10 when cover member 20 is applied thereto. Most preferably, sheet 21 having microwave shields 30 pre-applied thereon is stored in a roll 25. Less preferably, sheet 21 can be stored in a stacked fan-fold configuration as known in the art.

Figure 5:
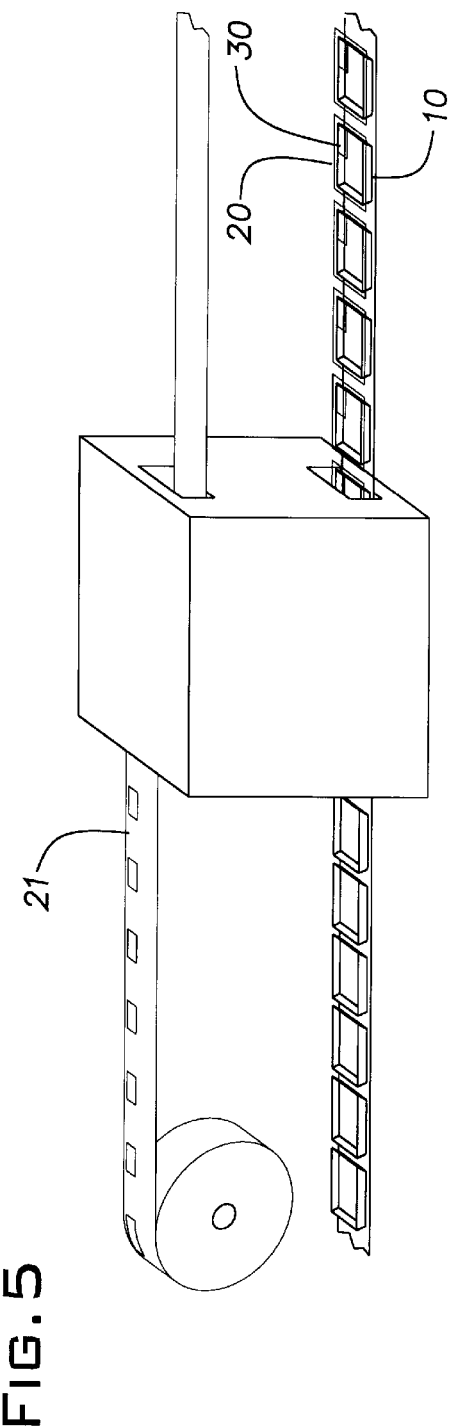
FIG. 5 is a schematic view of a process for applying cover members having microwave shields pre-applied thereon to food trays according to the invention.

Preferably, the shape, position, and indexing interval D of the microwave shields 30 on sheet 21 are selected such that each microwave shield is applied substantially in register with a desired food component in each tray in the packaging process. As seen in FIG. 5, the sheet of cover material 21 having indexed microwave shields 30 thereon is fed to a cover applicator machine. Food trays having the food already placed within are also fed successively to the cover applicator machine. The machine draws cover material from the sheet 21 and cuts out and applies a cover member having a microwave shield to each food tray. Preferably, the applicator machine can apply a cover member to each food tray at a rate of at least 100, preferably 200, preferably 300, preferably 400, food trays per minute.

Less preferably, microwave shields 30 can be applied separately after cover members 20 have been applied to food trays 10. This method is less preferred because it requires an extra step during the food packaging process.

Although the hereinabove described embodiments of the invention constitute the preferred embodiments, it should be understood that modifications can be made thereto without departing from the scope of the invention as set forth in the appended claims.

What is claimed is:

1. A method for providing a microwave-shield to a microwavable food tray having different foods therein requiring different degrees of microwave irradiation, the method comprising the steps of:
   (a) providing a microwavable food tray containing at least one low-absorbing and at least one high-absorbing food component, said low-absorbing food component requiring a greater degree of microwave irradiation to be heated to a desired temperature at the end of a microwave cooking cycle than said high-absorbing food component, said food tray comprising a cover member thereover to cover said foods in said food tray; and
   (b) adhering a microwave shield to said cover member of said food tray, said microwave shield being applied to said cover member substantially in register with said high-absorbing food component, said microwave shield being provided with a shape substantially corresponding to the shape of said high-absorbing food component, wherein said microwave shield is effective to divert a portion of incident microwave radiation away from said high-absorbing food component during a microwave cooking cycle.

2. A method according to claim 1, wherein said food tray has at least two compartments therein, said low-absorbing and high-absorbing food components being isolated from one another in said compartments.

3. A method according to claim 2, further comprising the step of providing a side microwave shield on a side wall of at least one of said compartments.

4. A method according to claim 1, wherein said diverted microwave radiation is directed toward an unshielded low-absorbing food component.

5. A method according to claim 4, wherein said microwave reflective layer is a metal foil layer.

6. A method according to claim 5, wherein said metal foil layer has a thickness of 0.001–0.020 inches.

7. A method according to claim 1, said microwave shield being an adhesive label consisting essentially of a microwave reflective layer and a PSA layer, said adhesive label being applied to said cover member by an automated labeling machine adapted to apply sufficient pressure when applying said label to activate said PSA layer during a microwavable food packaging process.

8. A method according to claim 7, wherein said labeling machine applies at least one adhesive label to one food tray cover member, said adhesive label being applied substantially in register with one food component in said food tray at a rate of at least 100 food trays per minute.

9. A method according to claim 7, wherein said labeling machine applies at least two adhesive labels to one food tray cover member, each of said adhesive labels being applied substantially in register with separate food components at a rate of at least 100 food trays per minute.

10. A method according to claim 7, wherein said PSA layer is substantially nontoxic.

11. A method according to claim 10, wherein said PSA layer causes no offensive odor and results in substantially no flavor transfer to any of said food components in said tray as a result of said microwave cooking cycle.

12. A method according to claim 7, wherein said microwave reflective layer is a non-metallic conductive layer.

13. A method according to claim 12, wherein said non-metallic conductive layer is selected from the group consisting of aluminum, tin, copper, brass, steel, and alloys thereof.

14. A method according to claim 1, said microwave shield being a conductive ink layer applied to said cover member by a printing machine.

15. A method according to claim 14, wherein said printing machine is controlled by a microprocessor, and whereby an operator inputs into the microprocessor the shape and position a desired conductive ink layer to be printed upon said cover member of said food tray, said shape and position of said desired layer being selected to be in register with a food component in said food tray, or a compartment of said food tray having a food component therein.

16. A method according to claim 14, wherein said operator further inputs into said microprocessor the shape and position of said conductive ink layer to be printed on said cover member.

17. A method according to claim 14, said conductive ink layer having a thickness of 0.0007–0.02 inches.

18. A method according to claim 14, wherein said printing machine prints at least one conductive ink layer on each food tray cover member, said at least one conductive ink layer being printed in register with a food component in said food tray at a rate of at least 100 food trays per minute.

19. A method according to claim 14, wherein said conductive ink comprises particles or flakes of conductive material dispersed in a liquid carrier.

20. A method according to claim 19, wherein said flakes of conductive material are aluminum flakes, and said liquid carrier is water based or UV-cured.

21. A method for providing a cover member having a microwave-shield to microwavable food trays having different foods requiring different degrees of microwave irradiation, the method comprising the steps of:
   (a) providing microwavable food trays having at least one low-absorbing and at least one high-absorbing food component, said low absorbing food component requiring a greater degree of microwave irradiation to be heated to a desired temperature at the end of a microwave cooking cycle than said high-absorbing food component;

(b) providing a sheet of food tray cover material, said sheet having a plurality of microwave shields applied thereto and indexed at discrete intervals along the length thereof; and (c) delivering said food trays successively to a cover applicator machine in a microwavable food packaging process, said cover applicator machine drawing cover material from said sheet and applying therefrom a cover member having a microwave shield to each food tray, wherein the indexing interval facilitates application of a cover member to each food tray in said packaging process such that each said microwave shield is applied substantially in register with a food component in each said tray.

22. A method according to claim 21, wherein said food tray has at least two compartments therein, said low-absorbing and high-absorbing food components being isolated from one another in said compartments, said method further comprising the step of providing a side microwave shield on a side wall of at least one of said compartments.

23. A method according to claim 21, wherein said applicator machine applies one cover member to one food tray at a rate of at least 100 food trays per minute.

24. A method according to claim 21, each said microwave shield being a conductive ink layer preprinted on said sheet of cover material.

25. A method according to claim 21, each said microwave shield being an adhesive label consisting essentially of a microwave reflective layer and a PSA layer, said adhesive labels being pre-applied to said sheet of cover material.

26. A method according to claim 25, wherein said microwave reflective layer is a metal foil layer.

27. A method according to claim 25, wherein said microwave reflective layer is a non-metallic conductive layer.

* * * * *